(12) United States Patent
Hiie

(10) Patent No.: US 8,788,899 B2
(45) Date of Patent: Jul. 22, 2014

(54) PROCESSING TRANSPORT PACKETS

(75) Inventor: Magnus Hiie, Tartu (EE)

(73) Assignee: Skype, Dublin (IE)

( * ) Notice: Subject to any disclaimer, the term of this patent is extended or adjusted under 35 U.S.C. 154(b) by 329 days.

(21) Appl. No.: 13/105,682

(22) Filed: May 11, 2011

(65) Prior Publication Data

US 2011/0283156 A1    Nov. 17, 2011

(30) Foreign Application Priority Data

May 13, 2010    (GB) .................................. 1008011.7

(51) Int. Cl.
*G06F 11/00* (2006.01)
*H03M 13/00* (2006.01)

(52) U.S. Cl.
USPC ............................ 714/746; 714/752; 714/776

(58) Field of Classification Search
USPC ......... 714/746, 751, 752, 712, 781, 784, 786, 714/788, 758, 776; 726/1, 13, 17; 326/8
See application file for complete search history.

(56) References Cited

U.S. PATENT DOCUMENTS

| | | | |
|---|---|---|---|
| 7,085,282 B2 * | 8/2006 | Belotserkovsky et al. | ... 370/442 |
| 7,751,324 B2 * | 7/2010 | Vadakital et al. | ............. 370/231 |
| 7,904,781 B2 * | 3/2011 | Sugai et al. | .................... 714/752 |
| 2002/0163911 A1 | 11/2002 | Wee et al. | |
| 2004/0236863 A1 | 11/2004 | Shen et al. | |
| 2006/0015799 A1 | 1/2006 | Sung et al. | |
| 2007/0280217 A1 | 12/2007 | Flanagan et al. | |
| 2009/0138784 A1 | 5/2009 | Tamura et al. | |
| 2009/0327842 A1 * | 12/2009 | Liu et al. | ........................ 714/776 |
| 2012/0005549 A1 * | 1/2012 | Ichiki et al. | ................... 714/748 |

FOREIGN PATENT DOCUMENTS

EP    2 045 972 A1    4/2009

OTHER PUBLICATIONS

Notification of Transmittal of the International Search Report and the Written Opinion of the International Searching Authority, or the Declaration for Int'l Application No. PCT/EP2011/057643; Date of Mailing: Aug. 17, 2011, 13 pp.
Search Report for GB Application No. GB1008011.7, Date of Search: Aug. 24, 2011, 1 pg.

(Continued)

*Primary Examiner* — Christine Tu
(74) *Attorney, Agent, or Firm* — Sonia Cooper; Jim Ross; Micky Minhas

(57) ABSTRACT

Method, relay node and computer program product for processing transport packets, the transport packets conveying: (i) data stream units forming a data stream, and (ii) correction data units relating to the data stream units, where each transport packet contains information identifying the content of units in that transport packet. Transport packets are received at the relay node, the data stream units in the transport packets received at the relay node being insufficient to constitute the data stream. At least some of the correction data units and the data stream units in the received transport packets are used to generate substitute data stream units thereby to substantially recover the data stream at the relay node. The relay node packetises the data stream units of the substantially recovered data stream with correction data units to form output transport packets for transmission from the relay node, and then the output transport packets are transmitted from the relay node.

31 Claims, 4 Drawing Sheets

(56) References Cited

OTHER PUBLICATIONS

Hisamatsu, S. et al., "Packet-Level Forward Erasure Correction with User Fairness in Lossy Wireless Networks," 2010 IEEE 21$^{st}$ International Symposium on Personal, Indoor, and Mobile Radio Communications Workshops (PIMRC Workshops); Sep. 26-30, 2010, Instanbul, Turkey, IEEE, Piscataway, NJ, USA, Sep. 26, 2010, pp. 496-501, XP031837172.

Ma, R. et al., "Reliable Multipath Routing with Fixed Delays in Manet Using Regenerating Nodes," Local Computer Networks, 2003. LCN '03. Proceedings. 28$^{th}$ Annual IEEE International Conference on Oct. 20-24, 2003, Piscataway, NJ, USA, IEEE, Oct. 20, 2003, pp. 719-725, XP010665665.

Yao, J. et al., "Experiments with Error-Correcting RTP Gateways," Multimedia Signal Processing, 1999 IEEE, 3$^{rd}$ Workshop on Copenhagen, Denmark Sep. 13-15, 1999, Piscataway, NJ, US, IEEE, Sep. 13, 1999, pp. 15-20, XP010351763.

\* cited by examiner

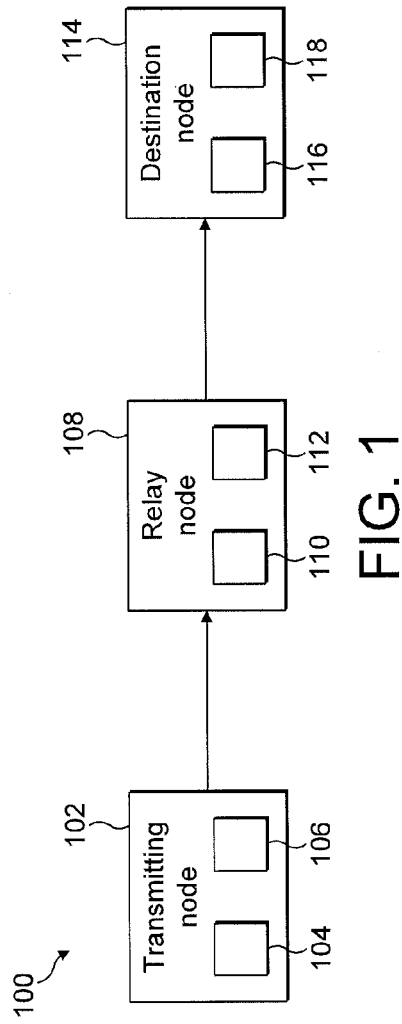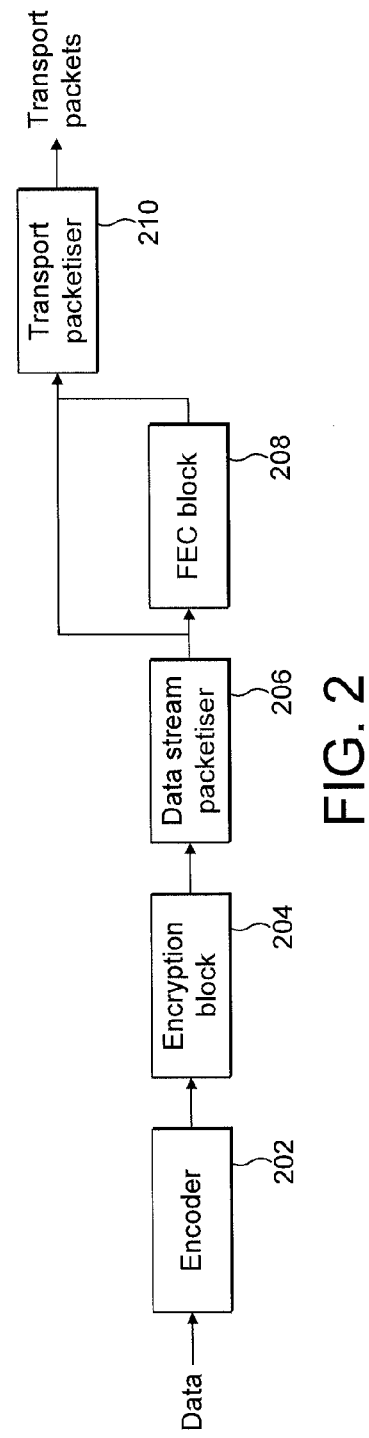

PROCESSING TRANSPORT PACKETS

RELATED APPLICATION

This application claims priority under 35 U.S.C. §119 or 365 to Great Britain Application No. 1008011.7, filed May 13, 2010. The entire teachings of the above application are incorporated herein by reference.

FIELD OF THE INVENTION

This invention relates to processing transport packets. In particular this invention relates to processing, at a relay node, transport packets which convey (i) data stream units forming a data stream, and (ii) correction data units relating to the data stream units.

BACKGROUND

When transmitting a data stream, formed from data stream units, between two nodes the data stream can be transmitted by way of a plurality of transport packets. Redundant correction data can be included in the transport packets in order for the destination node to correct for errors in the transmission of the transport packets. For example, Forward Error Correction (FEC) data can be included with the data units in the transport packets. FEC data is redundant data that allows data units in lost transport packets to be recovered to some extent. FEC data may be transmitted in separate transport packets that are interleaved into the data stream or added to the payload of transport packets containing the data units themselves. Media independent FEC works by adding redundancy to the bits of two or more payloads. One example of this is simply performing an exclusive OR (XOR) operation on multiple data units in the data stream to create the redundant information. If any of the payloads are lost in the transmission to the destination node, then the XORed information (i.e. the FEC data) together with the payloads of other transport packets (i.e. transport packets which are not lost) can be used at the destination node to recreate the lost payload.

The extent of data transfer over public networks such as the internet is rapidly increasing. Error correction mechanisms are therefore becoming more important to ensure reliable data transmission. The present invention seeks to improve the error correction for a data transmission between a transmitting node and a destination node.

SUMMARY

According to a first aspect of the present invention there is provided a method of processing transport packets, the transport packets conveying: (i) data stream units forming a data stream, and (ii) correction data units relating to the data stream units, each transport packet containing information identifying the content of units in that transport packet, the method comprising: receiving transport packets at a relay node, the data stream units in the transport packets received at the relay node being insufficient to constitute the data stream; using at least some of the correction data units and the data stream units in the received transport packets to generate substitute data stream units thereby to substantially recover the data stream at the relay node; packetising, at the relay node, the data stream units of the substantially recovered data stream with correction data units to form output transport packets for transmission from the relay node; and transmitting said output transport packets from the relay node.

According to a second aspect of the present invention there is provided a relay node for processing transport packets, the transport packets conveying: (i) data stream units forming a data stream, and (ii) correction data units relating to the data stream units, each transport packet containing information identifying the content of units in that transport packet, the relay node comprising: receiving means for receiving transport packets, the data stream units in the transport packets received at the relay node being insufficient to constitute the data stream; generating means for using at least some of the correction data units and the data stream units in the received transport packets to generate substitute data stream units thereby to substantially recover the data stream at the relay node; packetising means for packetising, at the relay node, the data stream units of the substantially recovered data stream with correction data units to form output transport packets for transmission from the relay node; and transmitting means for transmitting said output transport packets from the relay node.

According to a third aspect of the present invention there is provided a computer program product comprising computer readable instructions for execution by computer processing means at a relay node for processing transport packets, the transport packets conveying: (i) data stream units forming a data stream, and (ii) correction data units relating to the data stream units, each transport packet containing information identifying the content of units in that transport packet, the instructions comprising instructions for: receiving transport packets at the relay node, the data stream units in the transport packets received at the relay node being insufficient to constitute the data stream; using at least some of the correction data units and the data stream units in the received transport packets to generate substitute data stream units thereby to substantially recover the data stream at the relay node; packetising, at the relay node, the data stream units of the substantially recovered data stream with correction data units to form output transport packets for transmission from the relay node; and transmitting said output transport packets from the relay node.

In preferred embodiments, the data stream units are encrypted data stream units. Furthermore, in preferred embodiments, the relay node does not perform any decryption on the units of the received transport packets. The correction data units are preferably forward error correction (FEC) data units. The FEC data units are preferably media independent FEC data units.

For a number of reasons it may be advantageous to encrypt the data units that are sent in the transport packets between two nodes such that only the intended destination node(s) can retrieve the data. This may, for example, be because the data is sensitive data and/or because the data is being transmitted over an unsecure network between the two nodes.

In prior art systems the payloads of the transport packets can be encrypted before the transport packets are sent between the two nodes. Encryption mechanisms are known to people skilled in the art of data transmission. At the destination node the payloads of the transport packets are decrypted using a decryption mechanism that corresponds to the encryption mechanism used to encrypt the payloads at the transmitting node, as is known in the art. Therefore in these prior art systems, in order to implement error correction using FEC data, the payloads of the transport packets are decrypted at the destination node to retrieve the encrypted data and the FEC data. If transport packets have been lost in the transmission of the transport packets between the transmitting node and the destination node then the destination node can implement the error correction using the FEC data to recover the lost data in the transport packets. FEC data can be used at the destination node in combination with data in at least one received transport packet to recover the data units in lost data packets.

The inventors have realised that the route of a data transmission between a transmitting node and a destination node may not be direct. Often, it is necessary to transmit data via one or more relay nodes. In this sense a data transmission may comprise multiple "hops" in the network. Each hop may introduce errors into the data stream. However, in prior art systems the FEC is implemented only at the destination node (e.g. because the payloads of the transport packets are encrypted thereby rendering the FEC data unusable until decryption of the transport packets is performed). The inventors have realised that the encryption of the payloads of the transport packets in this way means that the payloads of the transport packets must be decrypted for the FEC data to be used to recover any lost transport packets comprising data units of the data stream. The transmitting node and the destination node are necessarily able to decrypt the payloads of the transport packets. However, the relay nodes may not be able to decrypt the payloads of the transport packets, since this would require the overhead of a decryption mechanism at the relay nodes, which may be considered excessive. Furthermore, an important aim of the operation of the relay nodes is to reduce any delay that they may introduce into the data transmission, and therefore it may be undesirable for the relay nodes to perform any decryption operations on the transport packets. Another reason why relay nodes may not be able to decrypt the transport packets, is that the relay nodes are often not trusted. Therefore in the prior art systems the relay nodes do not decrypt the transport packets to retrieve the FEC data. Therefore in the prior art systems the relay nodes do not implement any error correction.

The inventors have realised that since transport packets can be lost in a data transmission on every hop (e.g. on a transmitting node—relay node hop; on a relay node—relay node hop; or on a relay node-destination node hop) it may be advantageous to implement error correction at a relay node of the data transmission. This can be in addition to the error correction implemented at the destination node. It may be important for the data stream units in the transport packets to remain encrypted to ensure that the data is secure during the data transmission. However, in order for the relay nodes to perform error correction, the inventors have realised that the correction data units in the transport packets can be used to recover lost data stream units without performing any decryption at the relay node.

Advantageously, according to embodiments of the invention, recovery of lost data stream units is performed at relay nodes, rather than solely at destination nodes of a data transmission. Therefore lost data stream units can be recovered after each hop of a data transmission through a network. In this way the recovery is only required to recover transport packets that have been lost in the previous hop. This results in a lower rate of lost transport packets in a multiple-hop data transmission. This is in contrast to the prior art in which the recovery is performed only at the destination node which attempts to recover transport packets that have been lost on any of the multiple hops through the network. The embodiments of the invention will be able to recover more lost transport packets than the prior art systems. For example, transport packets lost on a first hop (e.g. transmitting node—relay node hop) can be recovered at the relay node, and these recovered transport packets can be used after a second hop (e.g. relay node—destination node hop) to recover transport packets lost on the second hop. Without the recovery of the transport packets lost on the first hop at the relay node, it may not be possible to recover as many transport packets lost on the second hop at the destination node.

BRIEF DESCRIPTION OF THE DRAWINGS

For a better understanding of the present invention and to show how the same may be put into effect, reference will now be made, by way of example, to the following drawings in which:

FIG. 1 is a schematic diagram of a data transmission system according to a preferred embodiment;

FIG. 2 is a block diagram representing a transmitting node according to a preferred embodiment;

DETAILED DESCRIPTION OF PREFERRED EMBODIMENTS

Figure 3:
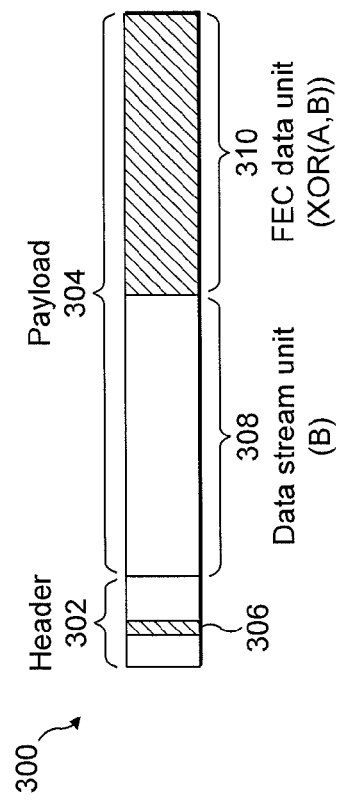
FIG. 3 is a schematic representation of a data packet according to a preferred embodiment.

Reference is first made to FIG. 1, which illustrates a communication system 100. The communication system 100 may be a peer to peer (P2P) communication system. Alternatively, other types of communication system could be used, such as non-P2P systems. The communication system 100 comprises a transmitting node 102, a relay node 108 and a destination node 114. The transmitting node 102 can transmit data to the relay node 108, for example over a network such as the internet. The relay node 108 can transmit data to the destination node 114, for example over a network such as the internet. Therefore the transmitting node 102 can transmit data to the destination node 114 via the relay node 108. It should be noted that although only one relay node 108 is shown in FIG. 1, in other embodiments more than one relay node may be present and the transmitting node 102 may transmit data to the destination node 114 via more than one of the relay nodes. Each of the transmitting node 102, relay node 108 and destination node 114 may be, for example, a mobile phone, a personal digital assistant ("PDA"), a personal computer ("PC") (including, for example, Windows™, Mac OS™ and Linux™ PCs), a gaming device or other embedded device able to communicate with the other nodes in the system 100.

The transmitting node 102 comprises a central processing unit ("CPU") 104 for processing data as is known in the art, and a network interface 106 which is used for transmitting and receiving data to and from a network, such as for transmitting data to the relay node 108. The relay node 108 comprises a CPU 110 for processing data as is known in the art, and a network interface 112 which is used for transmitting and receiving data to and from a network, such as for transmitting data to the destination node 114 and for receiving data from the transmitting node 102. The destination node 114 comprises a CPU 116 for processing data as is known in the art, and a network interface 118 which is used for transmitting and receiving data to and from a network, such as for receiving data from the relay node 108.

FIG. 2 shows blocks within the transmitting node 102. As shown in FIG. 2, the transmitting node 102 comprises an encoder 202, an encryption block 204, a data stream packetiser 206, an FEC block 208 and a transport packetiser 210.

An output of the encoder 202 is coupled to an input of the encryption block 204. The output of the encryption block 204 is coupled to an input of the data stream packetiser 206. An output of the data stream packetiser 206 is coupled to an input of the FEC block 208. An output of the FEC block 208 and an output of the data stream packetiser are coupled to inputs of the transport packetiser 210. The blocks 202 to 210 shown in FIG. 2 may be implemented in software and executed by the CPU 104 of the transmitting node 102. Alternatively, the blocks 202 to 210 shown in FIG. 2 may be implemented as hardware blocks at the transmitting node 102.

In operation, the transmitting node 102 has data to be transmitted to the destination node 114 via the relay node 108. As shown in FIG. 2, the data is input to the encoder 202. The encoder 202 encodes the data (e.g. sampled audio data), as is known in the art. Different types of data may be encoded in different ways. For example, specific speech encoding algorithms may be used in the encoder 202 when the data to be transmitted is speech data. Similarly, if the data to be transmitted is video data, the encoder 202 may use a specific video encoding algorithm to encode the video data. The exact mechanisms of the encoding implemented in the encoder 202 are known in the art and are not of importance to the present invention. The output of the encoder 202 is an encoded bit stream (or "data stream") which is input to the encryption block 204.

In the encryption block 204 the data stream is encrypted. One of a number of different encryption mechanisms may be implemented in the encryption block 204 to encrypt the data, as is known in the art. The destination node 114 is capable of decrypting the encrypted data once it has been transmitted to the destination node 114. To this end the encryption block 204 may use an encryption mechanism which has been agreed for use for transmission of data between the transmitting node 102 and the destination node 114. One possible encryption mechanism which may be used at the encryption block 204 is private-shared-key (symmetric) encryption, in which the encrypted data can only be decrypted using the correct key. Public key cryptography might be used for transmitting the shared key to the destination node. Preferably only the destination node 114 has access to the correct key for decrypting the data. In this way the data is only recoverable at the intended destination node 114. This ensures that the data is secure when it is transmitted between the transmitting node 102 and the destination node 114. Even if someone intercepts the data transmission they would not be able to decrypt the encrypted data without having access to the correct key. Note that where the data transmission is a multicast data transmission (i.e. there is more than one destination node) then each destination node 114 has access to a suitable key for decrypting the data.

The encrypted data stream is output from the encryption block 204 and input to the data stream packetiser 206. The data stream packetiser 206 splits the encrypted data stream into data stream units. The data stream units constitute the data stream. The data stream units have a sequence number in the data stream such that the data stream can be formed from the data stream units by organising the data stream units according to their sequence numbers.

The data stream units are output from the data stream packetiser 206 and input into the FEC block 208. The FEC block 208 generates FEC data units for the data stream units. One method for generating the FEC data units is to perform an exclusive OR (XOR) operation on the encrypted data stream units received from the data stream packetiser 206, thereby creating the redundant FEC data. The FEC data units are output from the FEC block 208.

The data stream units output from the data stream packetiser 206 and the FEC data units output from the FEC block 208 are input to the transport packetiser 210. The transport packetiser 210 packetises the data stream units and FEC data units into transport packets for transmission to the relay node 108. The units can be arranged into transport packets in a number of ways. For example, the transport packetiser 210 could arrange the units such that each transport packet includes one data stream unit and one FEC data unit. Alternatively, the transport packetiser 210 could arrange the units such that some transport packets include data stream units whilst other separate transport packets include FEC data units. The transport packetiser 210 could arrange the units such that some transport packets include multiple data stream units. The transport packetiser 210 could arrange the units such that some transport packets include multiple FEC data units. The exact arrangement of the units in the transport packets is not important. However, each transport packet contains information identifying the content of the units in that transport packet. This information can be used by the relay node 108 to determine which units are present in each transport packet. This information may for example be included in a header portion of the transport packets whilst the units are included in a payload portion of the transport packets.

As shown in FIG. 2 the transport packets are output from the transport packetiser 210 and can then be transmitted via the network interface 106 to the relay node 108. Advantageously, the FEC data units are generated after the encryption of the data stream, such that the FEC data is based on encrypted data. Therefore no decryption is required in order to use the FEC data in order to recover encrypted data stream units. The inventors have realised that there is no security risk of using FEC data in this way because the FEC data units relate to encrypted data stream units. For example, where the FEC data unit is the result of an XOR operation of two encrypted data stream units, if an unauthorised person intercepted the FEC data unit they could only recover the encrypted data stream units to which the FEC data unit relates, so the data stream units would still be encrypted and the security of the data transmission would not be compromised.

FIG. 3 shows a schematic representation of a transport packet 300 when it is transmitted from the transmitting node 102. The transport packet 300 comprises a header 302 and a payload 304. The header 302 comprises an indication 306 and the payload comprises a data stream unit 308 and an FEC data unit 310. The example transport packet of FIG. 3 includes a data stream unit 308 which is encrypted data stream unit B and a FEC data unit 310 which is the result of the XOR operation on encrypted data stream units A and B. The XOR operation is considered as a multiple-argument function (which is the identity function for a single argument, e.g. XOR(A)=A). In this example the FEC data unit 310 is the result of an XOR operation on data stream units A and B. Data stream unit A may be transmitted in a different transport packet to that shown in FIG. 3. It should be noted that FEC data unit 310 is considered to be an FEC data unit because it was generated by the FEC block 208. The indication 306 indicates that the payload 304 comprises data stream unit B 308 and FEC data unit XOR(A,B) 310. In this way the indication 306 indicates the data stream units (A and B) in the data stream to which the FEC data unit 310 relates. The indication 306 is transmitted in an unencrypted form. As shown in FIG. 3 the indication 306 is transmitted in the unencrypted header 302 of the data packet. Alternatively, the indication 306 could be transmitted in an unencrypted portion of the payload 304.

Figure 4:
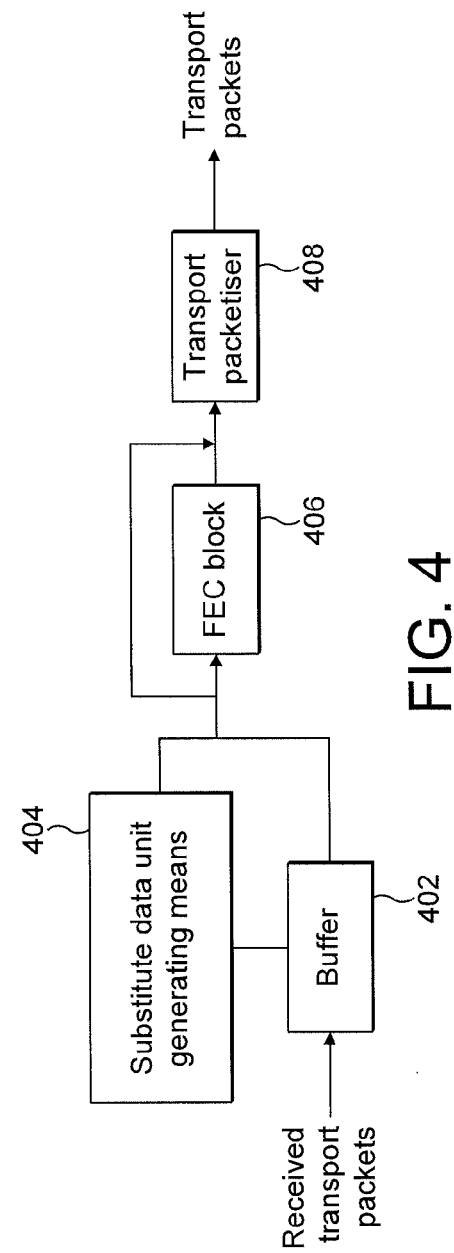
FIG. 4 is a block diagram representing a relay node according to a preferred embodiment.

FIG. 4 shows blocks within the relay node 108. As shown in FIG. 4, the relay node 108 comprises a buffer 402, a substitute data unit generating means 404, an FEC block 406 and a transport packetiser 408. The substitute data unit generating means 404 is coupled to the buffer 402. An output of the buffer 402 and an output of the substitute data unit generating means 404 are coupled to an input of the FEC block 406 and also coupled to an input of the transport packetiser 408. An output of the FEC block 406 is coupled to an input of the transport packetiser 408. The blocks 402 to 408 shown in FIG. 4 may be implemented in software and executed by the CPU 110 of the relay node 108. Alternatively, the blocks 402 to 408 shown in FIG. 4 may be implemented as hardware blocks at the relay node 108.

Figure 5:
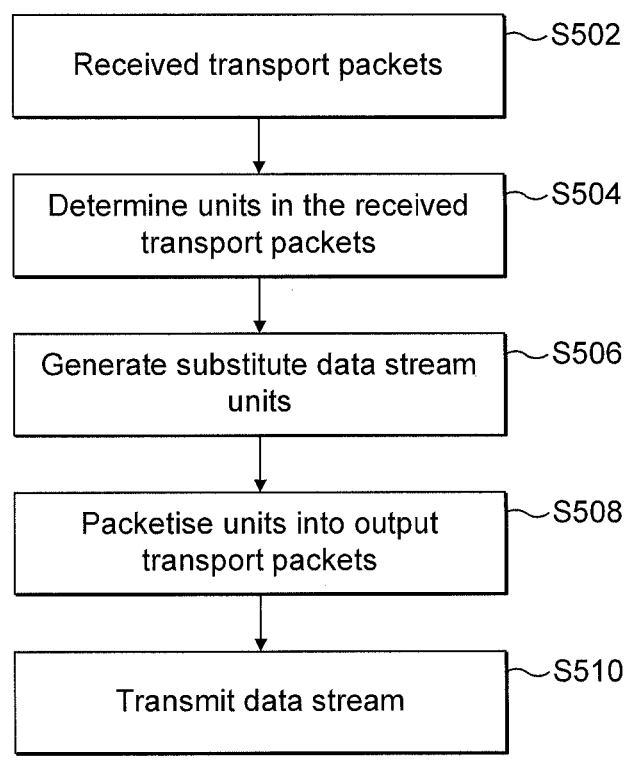
FIG. 5 shows a flowchart of a process for processing data packets of a data stream according to a preferred embodiment.

The operation of the relay node 108 is described with reference to FIG. 4 and to the flow chart shown in FIG. 5. In step S502 the transport packets transmitted from the transmitting node 102 are received at the relay node 108. The transport packets are received at the buffer 402 via the network interface 112. The received transport packets are stored in the buffer 402.

In step S504 the relay node determines which units are in the received transport packets. This can be achieved by using the indications 306 in the transport packets 300 which as described above identify the units in the transport packets. By determining which units the relay node has received in the transport packets, the relay node is able to determine which (if any) of the data stream units in the data stream are missing. The sequence numbers of the data stream units can be used in determining whether data stream units of the data stream are missing in the received transport packets.

In step S506 the substitute data unit generating means 404 generates substitute data stream units which can be used to form the data stream. In step S506 FEC data units in the received transport packets are used (in conjunction with received data stream units or other received FEC data units) to generate data stream units. In particular, received FEC data units can be used in the substitute data unit generating means 404 to generate data stream units that have not been received at the relay node. In this way the substitute data unit generating means 404 derives a data stream unit that has been lost in a lost transport packet. By generating the data stream units in the substitute data unit generating means 404, the relay node is able to substantially recover the data stream at the relay node, despite the data stream units in the transport packets received at the relay node 108 being insufficient to constitute the data stream due to lost transport packets. Substitute data stream units generated in the substitute data unit generating means 404 can replace data stream units in the data stream that have been lost in lost transport packets. If sufficient data stream units are received at the relay node then the substantially recovered data stream comprises all of the data stream units in the data stream such that the substantially recovered data stream reconstitutes the data stream. However, if too many transport packets are lost then it may not be possible to completely reconstitute the data stream at the relay node 108.

As an example, an FEC data unit of a first transport packet may have been generated as the result of an XOR operation on a data stream unit present in the first transport packet and the data stream unit of a lost transport packet. Therefore to recover the data stream unit of the lost transport packet the substitute data unit generating means 404 performs an XOR operation on the FEC data unit and the data stream unit of the first transport packet, and the result is the data stream unit of the lost transport packet. In this way the relay node 108 has recovered a data stream unit of a lost transport packet. It should be noted that this recovery is able to be performed at the relay node even when the data stream units are encrypted, without the relay node being required to perform any decryption operations. Therefore encrypted data is not decrypted at the relay node 108, thereby maintaining the security of the data transmission. However, the relay node 108 is able to derive an encrypted data stream unit of a lost transport packet to reduce the number of errors in the data stream received at the destination node 114.

As a result of step S504 the relay node 108 may, or may not, determine which data stream units of the data stream are missing because they have not been received in the received transport packets. In some embodiments, the substitute data unit generating means 404 may only generate data stream units which are determined to be missing from the data stream. In order to determine whether any data stream units in the data stream have been lost the relay node 108 can monitor the sequence numbers of the received data stream units. Other ways of determining that a data stream unit has been lost may also be used, as would be apparent to those skilled in the art. Where there is a missing data stream unit according to the sequence numbers of the received data stream units, this indicates that a data stream unit is lost in the data stream. The received transport packets are stored in the buffer 402 for a finite time, e.g. for a predetermined time or until memory capacity is exceeded. Data stream units in the received transport packets may be received at the relay node 108 out of sequence, for example due to conditions on the link between the transmitting node 102 and the relay node 108 or due to the way in which the data stream units were packetised into the transport packets in the transport packetiser 210 of the transmitting node 102. In preferred embodiments, data stream units received out of sequence are not considered lost if they are received at the buffer 402 within a predetermined time period of their expected arrival times at the relay node (due to their position in the data stream). In alternative embodiments, all data stream units received out of sequence are considered to be lost.

In other embodiments, the substitute data unit generating means 404 may generate all data stream units that can be determined from the units in the received transport packets. This may result in the substitute data unit generating means 404 generating data stream units that have actually also been received at the relay node, but having duplicate data stream units is not problematic.

In step S508 the data stream units of the substantially recovered data stream (i.e. received data stream units and data stream units generated in the substitute data unit generating means 404 in step S506) are packetised with correction data units in the transport packetiser 408 to form output transport packets for transmission from the relay node. The correction data units which are included in the output transport packets may be the correction data units that were present in the received transport packets. In this case, no FEC generation is required at the relay node 108 and as shown in FIG. 4 the units (i.e. the data stream units of the substantially recovered data stream and the received FEC data units) may be passed to the transport packetiser 408, bypassing the FEC block 406.

However, the relay node 108 may generate new FEC data units using the FEC block 406. The new FEC data units can be included in the output transport packets formed in the transport packetiser 408. For this to happen, the data stream units of the substantially recovered data stream are passed to the FEC block 406 (from the buffer 402 and the substitute data unit generating means 404) and the FEC block 406 generates new FEC data for those data stream units in the same way as in FEC block 208 of the transmitting node 102. This allows the FEC that is implemented on different hops between the transmitting node 102 and the destination node 114 to be different according to different loss characteristics on the different hops. The new FEC data units may replace the original FEC data units in the transport packets received at the relay node 108. The FEC generation in FEC block 406 does not introduce a significant delay into the data transmission because FEC generation is a simple process.

In step S510 the output transport packets formed in transport packetiser 408 in step S508 are transmitted from the relay node 108 to the destination node 114 via the network interface 112 of the relay node 108. The output transport packets include substitute data stream units generated by the substitute data unit generating means 404 to replace data stream units from lost transport packets. The destination node 114 treats the substitute data stream units in the same way as it treats the other data stream units in the data stream, as if they were transmitted from the transmitting node 102.

Figure 6:
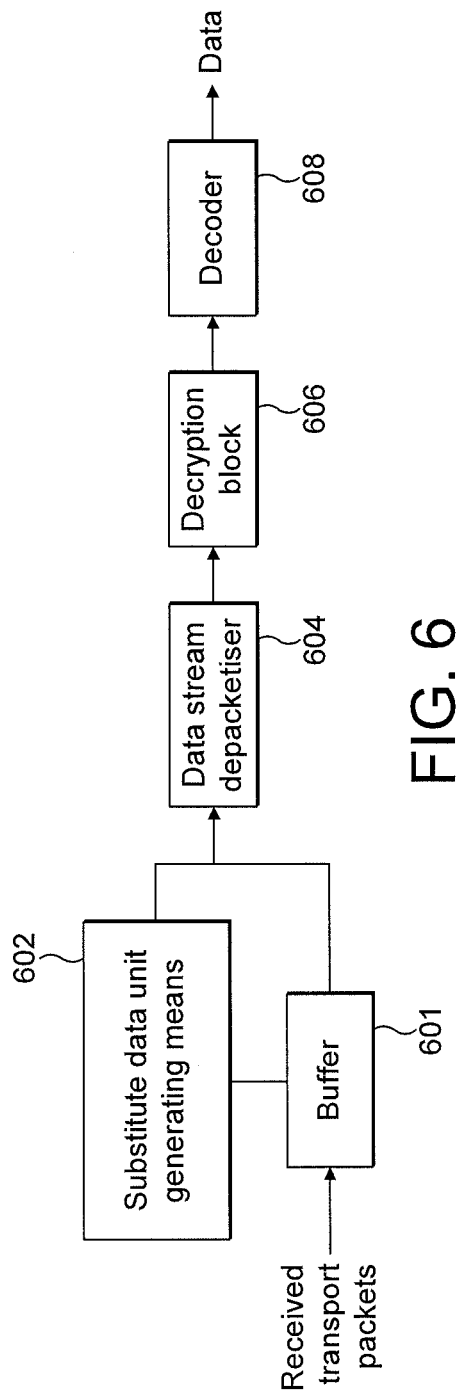
FIG. 6 is a block diagram representing a destination node according to a preferred embodiment.

FIG. 6 shows blocks within the destination node 114. As shown in FIG. 6, the destination node 114 comprises a buffer 601, a substitute data unit generating means 602, a data stream depacketiser 604, a decryption block 606 and a decoder 608. The substitute data unit generating means 602 is coupled to the buffer 601. An output of the buffer 601 is coupled to an input of the data stream depacketiser 604. An output of the substitute data unit generating means 602 is coupled to an input of the data stream depacketiser 604. An output of the data stream depacketiser 604 is coupled to an input of the decryption block 606. An output of the decryption block 606 is coupled to an input of the decoder 608. The blocks 601 to 608 shown in FIG. 6 may be implemented in software and executed by the CPU 116 of the destination node 114. Alternatively, the blocks 601 to 608 shown in FIG. 6 may be implemented as hardware blocks at the destination node 114.

In operation, the transport packets transmitted from the relay node 108 are received at the destination node at the network interface 118. The received transport packets are stored in the buffer 601.

The destination node 114 determines which units are in the received transport packets. This can be achieved by using the indications 306 in the transport packets which as described above identify the units in the transport packets. By determining which units the destination node 114 has received in the transport packets, the destination node 114 is able to determine which (if any) of the data stream units in the data stream are missing. The sequence numbers of the data stream units can be used in determining whether data stream units of the data stream are missing in the received transport packets.

In the same way as in substitute data unit generating means 404 described above in relation to the relay node 108, the substitute data unit generating means 602 of the destination node 114 generates substitute data stream units which can be used to form the data stream. In this way the destination node 114 uses the FEC data units in the transport packets to recover lost data stream units in the data stream, in a similar way to that described above at the relay node 108. The data stream units are then passed to the data stream depacketiser 604 (from both the buffer 601 and the substitute data unit generating means 602). The data stream depacketiser 604 extracts the encrypted data from the data stream units to generate an unpacketised data stream of the encrypted data. This data stream passes from the data stream depacketiser 604 to the decryption block 606 where the encrypted data is decrypted. The decryption mechanism matches the encryption mechanism used to encrypt the data at the transmitting node 102. For example, the destination node 114 may use a key corresponding to the key used to encrypt the data at the transmitting node 102 to thereby decrypt the data. The decrypted data is output from the decryption block 606 to the decoder 608. The decoder 608 decodes the data using a decoding algorithm that matches the encoding algorithm used at the encoder 202 of the transmitting node 102 to encode the data. For example, where the data is speech data, a specific speech decoding algorithm may be used to decode the data, and where the data is video data, a specific video decoding algorithm may be used to decode the data. The decoded data is output from the decoder 608 for use at the destination node 114.

There is described above in general terms a method for recovering data stream units that were lost in lost transport packets at a relay node. To further illustrate the invention there is now provided below a more specific example.

In this example, let us say that the encrypted data stream comprises encrypted data stream units A, B, C and D.

The transmitting node 102 packetises the data stream units into four transport packets (P1, P2, P3 and P4), such that:

P1 comprises (in its payload) a data stream unit A, which can be written as XOR(A), since XOR(A)=A. Transport packet P1 does not include any further units. The indication 306 of transport packet P1 would indicate that transport packet P1 includes only XOR(A) in its payload;

P2 comprises (in its payload) a data stream unit B, which can be written as XOR(B), since XOR(B)=B. Transport packet P2 also includes XOR(A) which has been generated by the FEC block 208 of the transmitting node 102. This FEC data unit (XOR(A)) relates to the data stream unit A by the very simple identity operation (i.e. no operation is required to generate the data stream unit A). The indication 306 of transport packet P2 would indicate that transport packet P2 includes XOR(B) and XOR(A) in its payload;

P3 comprises (in its payload) a data stream unit C, which can be written as XOR(C), since XOR(C)=C. Transport packet P3 also includes XOR(A,B) which has been generated by the FEC block 208 of the transmitting node 102. This FEC data unit (XOR(A,B)) relates to the data stream units A and B by being the result of an XOR operation of A and B. The indication 306 of transport packet P3 would indicate that transport packet P3 includes XOR(C) and XOR(A,B) in its payload;

P4 comprises (in its payload) a data stream unit D, which can be written as XOR(D), since XOR(D)=D. Transport packet P4 also includes XOR(A,B,C) which has been generated by the FEC block 208 of the transmitting node 102. This FEC data unit (XOR(A,B,C)) relates to the data stream units A, B and C by being the result of an XOR operation of A,B and C. The indication 306 of transport packet P4 would indicate that transport packet P4 includes XOR(D) and XOR(A, B,C) in its payload;

In summary, this can be written as:
P1: XOR(A) (equals A)
P2: XOR(B) (equals B)
  XOR(A) (equals A)
P3: XOR(C) (equals C)
  XOR(A,B)
P4: XOR(D) (equals D)
  XOR(A, B, C)

In this example, receiving transport packet P2, tolerates the loss of transport packet P1. This is because if transport packet P2 is received then there is enough information to determine both data stream units A and B. Similarly, receiving transport packet P3 tolerates the loss of transport packet P1 or P2 (but not both). This is because in transport packets P2 and P3 there is enough information to determine data stream units A, B and C by performing suitable XOR operations as would be apparent to a skilled person. Likewise, in transport packets P1 and P3 there is enough information to determine data stream units A, B and C by performing suitable XOR operations as would be apparent to a skilled person.

In a variation to the example given above, transport packet P2 also comprises (in its payload) XOR(A,B) which has been generated by the FEC block 208 of the transmitting node 102, such that now:

P2: XOR(B) (equals B)
　　XOR (A) (equals A)
　　XOR(A,B)

In this variation, receiving transport packets P2 and P4 is sufficient to determine A, B, C and D. This is because transport packet P2 includes A and B, transport packet P4 include D, and C can be determined by performing the operation XOR(XOR(A,B),XOR(A,B,C)). It can be seen in this example that a data stream unit can be recovered from two sets of FEC data without necessarily requiring an original data stream unit. In the example here, the FEC data unit XOR(A,B) from transport packet P2 can be used in conjunction with the FEC data unit XOR(A,B,C) from transport packet P4 to generate the data stream unit C.

In the methods described above, a substitute data stream unit may sometimes be generated for a data stream unit that is not actually lost in the data stream. This may be because the transport packet containing that data stream unit experienced a long delay in the transmission between the transmitting node 102 and the relay node 114 (e.g. longer than the predetermined time for which the data packets are stored in the buffer 402 in the relay node 108). Therefore it is possible that the destination node 114 will receive a recovered version and an original version of the same data stream unit, each having the same sequence number. In this case the data stream depacketiser 604 in the destination node 114 is arranged to discard a data stream unit having the same sequence number as another data stream unit.

There has therefore been described above an exemplary method for transmitting data from a transmitting node 102 to a destination node 114 via a relay node 108. The data remains encrypted throughout the data transmission to ensure the security of the data. However, the relay node 108 is able to implement forward error correction on the data stream units of the data stream because the FEC data units in the transport packets relate to encrypted data stream units and therefore do not require decryption before they can be used to recover encrypted data stream units. The FEC data is media independent FEC data, and relates to the encrypted versions of the data stream units.

In the preferred embodiments described above FEC data is used. In alternative embodiments, other types of correction data may be used instead of FEC data provided that the correction data allows the data stream units of a lost transport packet to be recovered using the correction data and other received units at the relay node 108.

The transmitting node 102 and the destination node 114 can be referred to as end points in the data transmission. For example, where the data is call data being transmitted over the internet, the transmitting node 102 may be a calling end point of the call and the destination node 114 may be a called end point of the call. The call data is transmitted over the internet via the relay node 108 between the calling end point and the called end point. In this way the methods described above can be used for calls over the internet, implementing for example voice over Internet Protocol (VoIP). The quality of the call can be increased by implementing the methods described above since data stream units lost between hops through the network can be recovered at the relay node(s). In other words, lost packets can be recovered after intermediate hops in the data transmission which can reduce the overall data stream unit loss in the data stream received at the destination node 114. In this way, a greater number of the transmitted data stream units will arrive at the destination node 114, thereby resulting in a better call quality. The methods described above are also useful for transmitting any other type of data between the transmitting node 102 and the destination node 114.

As would be apparent to a person skilled in the art, a computer program product can be implemented at the relay node 108 comprising instructions for performing the method described above.

Whilst in the above described embodiments of the invention the FEC data units are unencrypted, i.e. generated after encryption, in alternative embodiments of the invention the FEC data units are encrypted and it is only necessary for the indication 306 indicating which data stream unit a FEC data until has been generated from to be unencrypted in order for the relay to be able to recover the lost data.

For example, FEC data could be generated by adding redundant data packets, e.g. copying every other data packet or every third data packet etc—in this case FEC data generated before encryption could still be used to recover lost packets at the relay, provided that the indication 306 indicating which encrypted data stream unit an encrypted FEC unit has been generated from is transmitted to the relay node unencrypted. Using the unencrypted indication 306, the relay can recover an encrypted data stream unit by copying the encrypted FEC data unit that relates to it, thus recovering the data units transmitted from the transmitter.

A further embodiment that would require the FEC data units to be encrypted is when using media dependant FEC e.g. Low Bit Rate Redundancy (LBRR) which must be generated from unencrypted data. Whilst a lost data stream unit in this case could not be recovered completely, the relay node can determine that a data stream unit is lost and generate a second encrypted FEC data unit representing the lost data stream unit in order to avoid losing the data completely in the event that the first FEC data unit is lost during additional hops of the transmission.

In some embodiments of the invention it is not necessary to transmit data stream units in addition to FEC data units. In these alternative embodiments the FEC data units convey information about the data stream units and the data stream units themselves are not necessarily additionally transmitted. For example, it may be possible for all data packets in the data stream to only include XORs of multiple packets that when combined allow a data packet to be recovered (e.g. XOR (XOR(A,B), XOR(A,B,C)),In a further example, data stream unit A is not transmitted, instead data stream unit A input into the FEC block is split between multiple FEC data units that need to be combined in order to recover the data stream unit A.

There is therefore provided a method of processing transport packets, the transport packets comprising correction data units conveying information relating to encrypted data stream units, in which each transport packet contains unencrypted recovery data indicating how the correction data units relate to the encrypted data stream units. The method comprises receiving transport packets at a relay node, and using at least some of the correction data units in the received transport packets and the unencrypted recovery data to recover a lost transport packet at the relay node. The relay node packetises correction data units to form output transport packets for transmission from the relay node, and transmits said output transport packets from the relay node.

While this invention has been particularly shown and described with reference to preferred embodiments, it will be understood to those skilled in the art that various changes in form and detail may be made without departing from the scope of the invention as defined by the appendant claims.

The invention claimed is:

1. A method comprising:
processing transport packets, the transport packets conveying: (i) data stream units forming a data stream, and (ii) correction data units relating to the data stream units generated from an operation performed on a first encrypted data stream unit and a second encrypted data stream unit, each transport packet containing the data stream units, the correction data units, and information identifying the content of the units in that transport packet, the processing transport packets further comprising:
receiving transport packets at a relay node, the data stream units in the transport packets received at the relay node being insufficient to reconstitute the data stream;
using at least some of the correction data units and the data stream units in the received transport packets to generate substitute data stream units thereby to substantially recover the data stream at the relay node;
packetising, at the relay node, the data stream units of the substantially recovered data stream with correction data units to form output transport packets for transmission from the relay node; and
transmitting said output transport packets from the relay node.

2. The method of claim 1 wherein the data stream units are encrypted data stream units.

3. The method of claim 2 wherein the relay node does not perform any decryption on the data stream units of the received transport packets.

4. The method of claim 1 wherein said information identifying the content of the units in the transport packet identifies the relationships between the correction data units and the data stream units.

5. The method of claim 1 wherein said information identifying the content of the units in the transport packet is unencrypted.

6. The method of claim 4 wherein said information identifying the content of the units in the transport packet is in a header of each transport packet.

7. The method of claim 1 wherein the substantially recovered data stream comprises all of the data stream units in the data stream such that the substantially recovered data stream reconstitutes the original data stream.

8. The method of claim 1 wherein the correction data units relate to the data stream units by being the results of performing XOR operations on at least one of the data stream units.

9. The method of claim 8 wherein at least one of the substitute data stream units is generated by performing an XOR operation on one of the correction data units and one of the data stream units in the received transport packets.

10. The method of claim 8 wherein at least one of the substitute data stream units is generated by performing an XOR operation on two of the correction data units in the received transport packets.

11. The method of claim 1 wherein the substitute data stream units replace data stream units in lost transport packets.

12. The method of claim 1 wherein the received transport packets are received at the relay node over a network from a transmitting end point.

13. The method of claim 1 wherein the output transport packets are transmitted from the relay node over a network to a destination end point.

14. The method of claim 1 wherein the correction data units are forward error correction data units.

15. The method of claim 1 wherein each of the received transport packets comprises an unencrypted header, the data stream unit, and the correction data unit.

16. The method of claim 15 wherein each of the transport packets comprises a payload and the unencrypted header, and wherein the data stream units and the correction data units are in the payloads of the transport packets.

17. The method of claim 1 wherein the operation performed to generate the correction data units are comprises an XOR operation performed on the first encrypted data stream unit and the second encrypted data stream unit.

18. The method of claim 1 further comprising generating new correction data units at the relay node and including the new correction data units in the output transport packets transmitted from the relay node.

19. The method of claim 1 wherein each of the data stream units includes a sequence number indicating the order of each data stream unit in the data stream.

20. The method of claim 1 further comprising generating all substitute data stream units that can be derived from the correction data units in the received transport packets.

21. The method of claim 1 further comprising determining that particular data stream units of the data stream are not received at the relay node in the received transport packets, wherein said substitute data stream units are generated to replace those particular data stream units of the data stream in response to said determination.

22. The method of claim 21 wherein said determination comprises determining whether data stream units are received at the relay node within a predetermined time of their expected arrival times at the relay node.

23. The method of claim 1 further comprising storing the received transport packets in a buffer at the relay node for a limited time period.

24. A relay node for processing transport packets comprising:
a buffer configured to store the transport packets, the transport packets conveying: (i) data stream units forming a data stream, and (ii) correction data units relating to the data stream units, each transport packet containing the data stream units, the correction data units sufficient to enable generation of substitute data stream units for at least one transport packet, and information identifying the content of the units in that transport packet, the relay node further comprising:
a receiver configured to receive transport packets, the data stream units in the transport packets received at the relay node being insufficient to reconstitute the data stream;
a generator configured to use at least some of the correction data units and the data stream units in the received transport packets to generate substitute data stream units thereby to substantially recover the data stream at the relay node;
a packetiser configured to packetise, at the relay node, the data stream units of the substantially recovered data stream with correction data units to form output transport packets for transmission from the relay node; and
a transmitter configured to transmit said output transport packets from the relay node.

25. The relay node of claim 24 wherein the relay node is not configured to perform any decryption on the data stream units of the received transport packets.

26. The relay node of claim 24 further comprising a further generator configured to generate new correction data units and including the new correction data units in the output transport packets transmitted from the relay node.

27. The relay node of claim 24 further comprising a determiner configured to determine that particular data stream units of the data stream are not received at the relay node in the received transport packets, wherein said generator is configured to generate substitute data stream units to replace those particular data stream units of the data stream in response to said determination.

28. The relay node of claim 24 further comprising a buffer for storing the received transport packets for a limited time period.

29. A computer program product embodied on a computer readable storage device comprising computer readable instructions for execution by computer processing means at a relay node comprising:
  processing transport packets, the transport packets conveying: (i) data stream units forming a data stream, and (ii) correction data units relating to the data stream units generated from an operation to combine correction data from at least two encrypted data stream units, each transport packet containing the data stream units, the correction data units, and information identifying the content of the units in that transport packet, the instructions further comprising instructions for:
    receiving transport packets at the relay node, the data stream units in the transport packets received at the relay node being insufficient to constitute the data stream;
    using at least some of the correction data units and the data stream units in the received transport packets to generate substitute data stream units thereby to substantially recover the data stream at the relay node;
    packetising, at the relay node, the data stream units of the substantially recovered data stream with correction data units to form output transport packets for transmission from the relay node; and
  transmitting said output transport packets from the relay node.

30. A method comprising:
  processing transport packets, each of the transport packets comprising encrypted data stream units and non-encrypted correction data units, the correction data units conveying information relating to encrypted data stream units sufficient to enable generation of substitute data stream units for at least one transport packet, and each transport packet containing unencrypted recovery data indicating how the correction data units relate to the encrypted data stream units, the method further comprising:
  receiving transport packets at a relay node;
  using at least some of the correction data units in the received transport packets and the unencrypted recovery data to recover a lost transport packet at the relay node;
  packetising, at the relay node, correction data units to form output transport packets for transmission from the relay node; and
  transmitting said output transport packets from the relay node.

31. A method comprising:
  processing transport packets, each of the transport packets comprising encrypted data stream units, non-encrypted correction data units generated from an operation performed on a first encrypted data stream unit and a second encrypted data stream unit, and a sequence number, the sequence number conveying information relating to encrypted data stream units forming a data stream, and each transport packet containing unencrypted recovery data indicating how the non-encrypted correction data units relate to the encrypted data stream units, the method further comprising:
  receiving transport packets at a relay node;
  using at least some of the units in the received transport packets and the unencrypted recovery data at the relay node to generate substitute units which relate to the encrypted data stream units for use in substantially recovering the data stream;
  packetising, at the relay node, at least some of the units of the received transport packets and the substitute units to form output transport packets for transmission from the relay node; and
  transmitting said output transport packets from the relay node.

* * * * *